United States Patent
Ahvenlampi et al.

(10) Patent No.: US 6,394,156 B1
(45) Date of Patent: May 28, 2002

(54) METHOD FOR CUTTING TREES IN THE VICINITY OF A POWER LINE AND A TOPPING SAW

(75) Inventors: Jorma Ahvenlampi; Hannu Oksanen, both of Paimio (FI)

(73) Assignee: Länsitec Oy, Paimio (FI)

( * ) Notice: Subject to any disclaimer, the term of this patent is extended or adjusted under 35 U.S.C. 154(b) by 0 days.

(21) Appl. No.: 09/673,572

(22) PCT Filed: Jun. 1, 1998

(86) PCT No.: PCT/FI98/00466
§ 371 (c)(1),
(2), (4) Date: Oct. 18, 2000

(87) PCT Pub. No.: WO99/53748
PCT Pub. Date: Oct. 28, 1999

(30) Foreign Application Priority Data

Apr. 21, 1998 (FI) .................................................. 980880

(51) Int. Cl.⁷ ........................ A01G 23/095; B23Q 15/00
(52) U.S. Cl. ..................... 144/343; 144/4.1; 144/24.13; 144/335; 144/356; 56/11.9; 56/235; 56/DIG. 9; 356/139.04; 396/12; 396/52
(58) Field of Search .............................. 144/24.13, 4.1, 144/34.1, 335, 336, 338, 343, 356; 56/11.9, 235, DIG. 9; 244/17.1, 118.1, 17.23; 356/139.04; 396/12, 52

(56) References Cited

U.S. PATENT DOCUMENTS 4,554,781 A * 11/1985 Rugers ........................ 56/11.9
4,662,414 A * 5/1987 Fandrich ..................... 144/335
4,815,263 A * 3/1989 Hartung et al. ............... 56/11.9
4,984,757 A * 1/1991 Hartung et al. .......... 244/137.4
5,305,972 A * 4/1994 Hancocks ................ 144/24.13
5,589,901 A * 12/1996 Means
6,263,932 B1 * 7/2001 Chalifoux ................ 144/24.13

* cited by examiner

Primary Examiner—W. Donald Bray
(74) Attorney, Agent, or Firm—Kubovcik & Kubovcik

(57) ABSTRACT

A method for cutting trees (18) in the vicinity of a power line (10) using a topping saw (17) suspended from a helicopter (15) in such a way that the helicopter is flown in the direction of the power line (10) so close to the electricity wires (12) that the topping saw suspended from the helicopter cuts the desired tops of the trees. The cutting line (14) of the topping saw (17) is determined in such a way that the helicopter is flown with the help of a video camera (21) attached to the suspension bar (16) for the topping saw at an angle of 45° and a monitor (22) placed in connection with the helicopter's cockpit so that the video camera is kept directed towards the electricity wire (12) of the power line (10). The distance (a, b) of the point where trees are to be cut from the electricity wire (12) is determined by adjusting the distance (h) of the video camera from the cutting blade (20) of the topping saw (17). The topping saw (17) comprises two cutting blades (20) that rotate horizontally and in the same direction and a motor (28) that rotates the cutting blades.

8 Claims, 4 Drawing Sheets

METHOD FOR CUTTING TREES IN THE VICINITY OF A POWER LINE AND A TOPPING SAW

The object of the invention is a method for cutting trees in the vicinity of a power line.

Land areas in the vicinity of power lines must be kept free of trees, as it is thus possible to prevent line damage caused by trees that might touch the electricity wires and disturbances in power distribution caused thereby. However, as trees tend to grow particularly fast especially in open power line areas, power lines must be cleared regularly by cutting trees that have grown too close to the electricity wires. According to a known method, trees are cut manually using a power saw, for example. Manual work is, however, arduous and very slow. In addition, when trees are cut with a power saw, the whole tree often has to be felled, even though it would be sufficient to cut only the top of the tree to prevent the tree from touching the electricity wires.

The aim of the present invention is to achieve a new method for cutting trees that are in the vicinity of a power line. It is characteristic of the method relating to the invention that the tops of the trees are cut using a topping saw suspended from a helicopter in such a way that the helicopter is flown in the direction of the power line so close to the electricity wires that the topping saw suspended from the helicopter cuts the desired treetops.

By the method relating to the invention it is possible to cut the tops of the trees growing in the area of a power line at the desired distance from the electricity wire of the power line. By using the helicopter it is possible to move fast and at the same time to achieve the desired sawing line in order to achieve a clear strip of the desired size in the vicinity of the electricity wires.

According to a preferred embodiment of the method relating to the invention the tops of the trees are cut with a topping saw suspended from a helicopter, the saw comprising a motor and two cutting blades that rotate in the same direction.

According to a second preferred embodiment of the method relating to the invention the cutting line of the topping saw attached to the helicopter is determined in such a way that the helicopter is flown so that the sighting device incorporated in the topping saw is directed towards the electricity wire of the power line.

According to a third preferred embodiment of the method relating to the invention the cutting line of the topping saw attached to the helicopter is determined with the help of a video camera attached to the suspension bar for the topping saw, in such a way that the helicopter is flown with the help of a monitor placed in connection with the helicopter's cockpit, the video camera being directed towards the electricity wire of the power line.

According to yet another preferred embodiment of the method the upper limit of the area where trees are to be cut is formed at an angle of 45° in relation to the horizontal plane, in such a way that the video camera is attached to the suspension bar for the topping saw at an angle of 45°, and the helicopter is flown with the video camera directed towards the electricity wire of the power line and that the distance from the electricity wire of the point where trees are to be cut is determined by adjusting the distance of the video camera from the cutting blade of the topping saw.

Another object of the invention is a topping saw for cutting trees which are in the vicinity of a power line. It is characteristic of the topping saw relating to the invention that the topping saw comprises at least one cutting blade for cutting the tops of the trees, which cutting blade most preferably rotates in the direction of the horizontal plane, and that the topping saw is suspended from a helicopter by means of an intermediate element.

According to a preferred embodiment of the topping saw relating to the invention the topping saw comprises two cutting blades that are mainly horizontal and rotate in the same direction, and a motor that rotates the cutting blades.

According to a second preferred embodiment of the topping saw relating to the invention the topping saw comprises a sighting device which can be directed towards the electricity wire of the power line in order to determine the desired sawing line to be used when cutting the trees.

According to a third preferred embodiment of the topping saw, a video camera is attached to the suspension bar for the topping saw and there is a monitor in connection with the cockpit of the helicopter, with the help of which monitor the helicopter can be flown in such a way that the video camera is directed towards the electricity wire of the power line in order to achieve the desired sawing line.

According to yet another preferred embodiment of the topping saw, the video camera is attached to the suspension bar for the topping saw most preferably at an angle of 45° so that the upper limit of the area where trees are to be cut also forms an angle of 45° in relation to the horizontal plane, and that the distance of the video camera from the cutting blade of the topping saw can be adjusted in order to set the desired distance between the point where trees are to be cut and the electricity wire.

The invention is described in the following by way of an example, with reference to the appended drawings in which FIG. 1 shows a diagrammatic view of the cross-section of the power line, in which areas that are to be cleared of trees or treetops are marked with a broken line.

Figure 1:
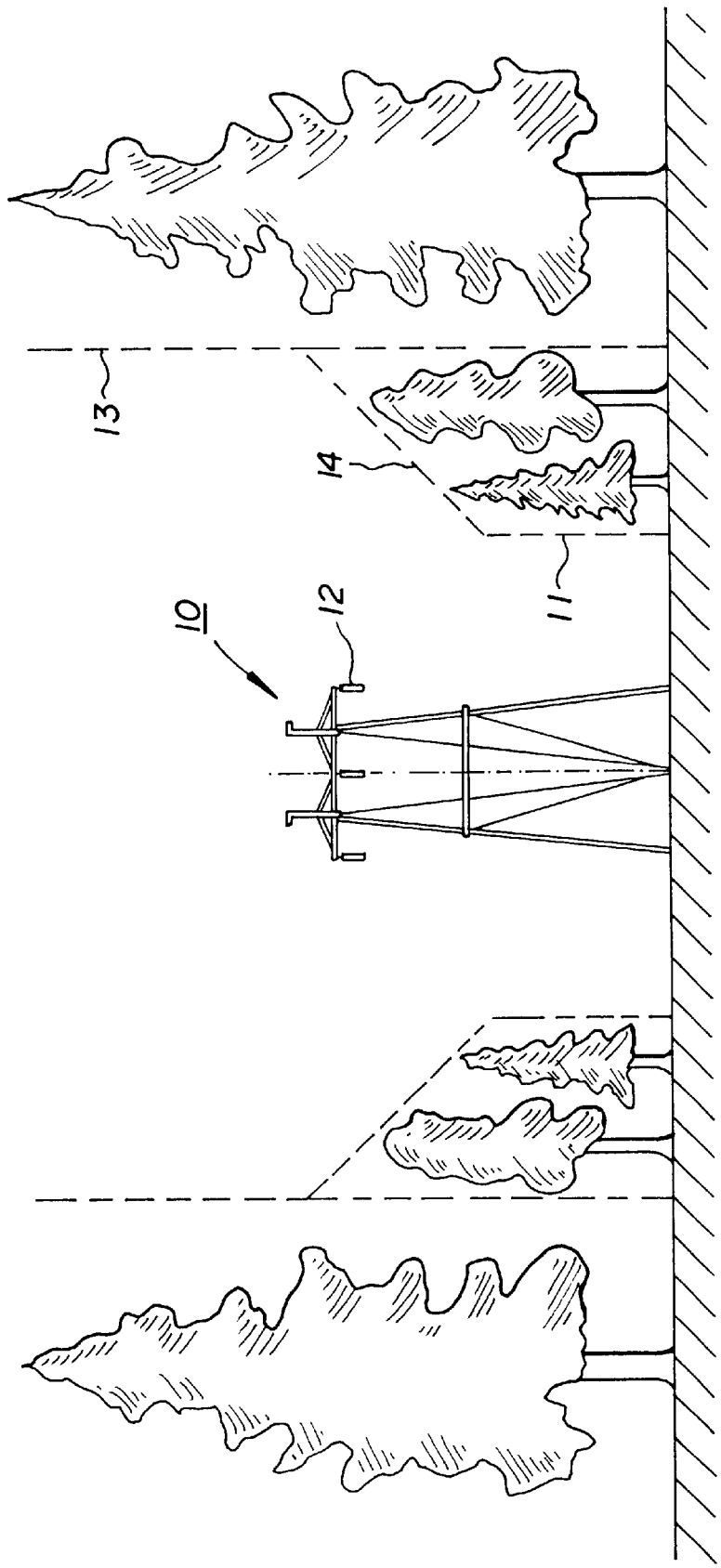

FIG. 1 shows the cross-section of the power line 10 and the areas in the vicinity of the power line that are to be cleared of trees or treetops. In FIG. 1 the inner limit of the cutting area, inside which there may be no trees closer to the electricity wires 12, is marked with a broken line 11. The outer limit of the cutting area, beyond which trees need not be cleared, is marked with a broken line 13. Between the inner limit 11 and the outer limit 13 of the cutting area, there is an inclined area, in which the trees that are closer to the power line must be cut shorter than the trees that are further away. The upper limit of the cutting area, at an angle of 45° as required by cutting regulations, above which treetops must be cut, is marked with a broken line 14.

Figure 2:
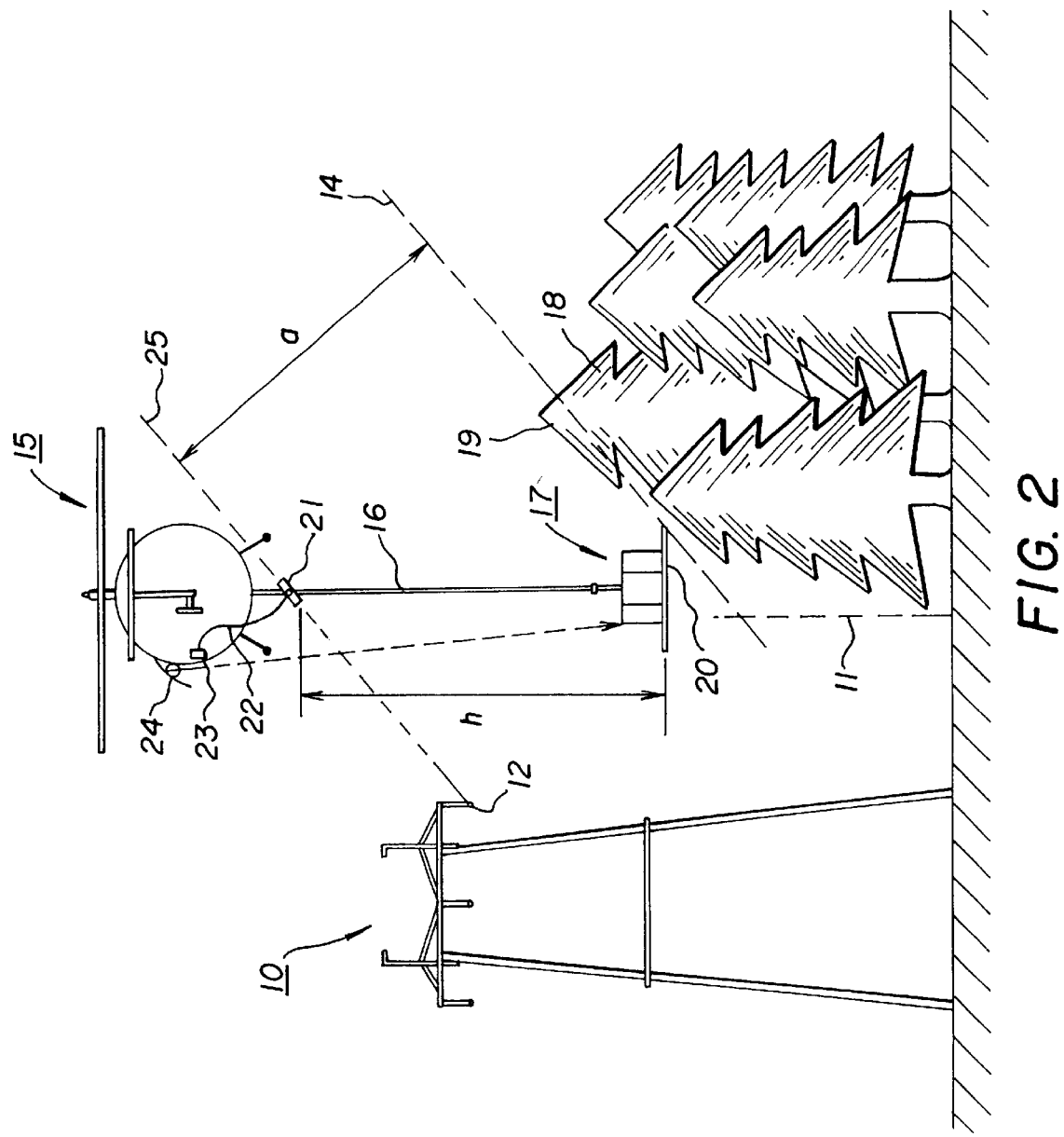
FIG. 2 shows a diagrammatic view of the cross-section of the power line and the cutting of the treetops using a topping saw attached to a helicopter.

FIG. 2 shows a diagrammatic view of the cross-section of the power line 10 and the helicopter 15 to which has been attached the topping saw 17 suspended from a bar 16. It can be seen in FIG. 2 that it is advantageous to cut treetops with the topping saw 17, particularly above the upper limit 14 of the cutting area, the said limit being at an angle of 45°. The cutting of the tops 19 of the trees 18 is carried out by means of a helicopter 15, in such a way that the helicopter is flown in the direction of the power line 10 at different distances from the power line 10 so that all the tops 19 of the trees 18 that are above the upper limit 14 of the cutting area are cut.

FIG. 2 shows a diagrammatic view of the method by which the flyer of the helicopter 15 can fly so that the cutting blade 20 of the topping saw 17 is continuously at the desired distance (a) from the line 25 that goes through the electricity wire 12 of the power line 10. To enable determination of the correct cutting line, a video camera 21 has been attached at an angle of 45° to the bar 16 suspended from the helicopter 15 at the desired height (h) from the cutting blade 20, the said video camera 21 having been connected with a cable 22 to the monitor 23 in the cockpit of the helicopter. In such case the flyer 24 of the helicopter 15 can, while flying, follow with his eyes both the topping saw 17 and the picture of the electricity wire 12 shown in the monitor 23. When the flyer 24 keeps the helicopter 15 continuously at a height where the picture of the electricity wire 12 can be seen in the monitor 23, the video camera 21 is always at some point on the line 25 shown by a broken line in the figure. In such case the cutting blade 20 of the topping saw 17 for cutting the tops 19 of the trees 18 is continuously at some point on the upper limit 14 of the cutting area.

Figure 3:
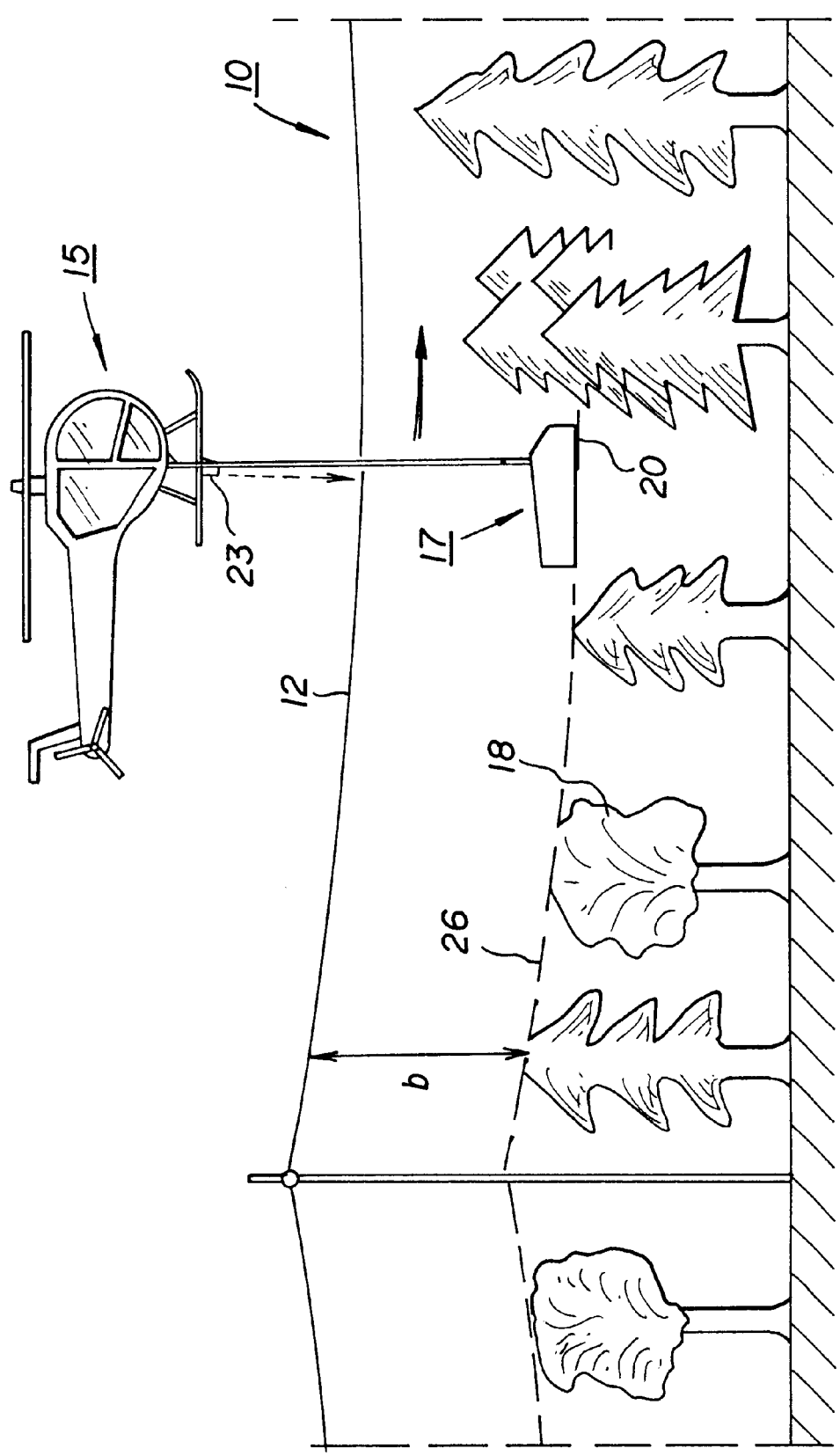
FIG. 3 shows a diagrammatic view of the cutting of the treetops when the helicopter is moving in the direction of the power line.

FIG. 3 shows, as seen from the side, the helicopter 15, which is flying in the direction of the power line 10. When the flyer keeps the helicopter 15 continuously at a height where the video camera 23 sees the electricity wire 12, the cutting blade 20 of the topping saw 17 is continuously at the correct height. It can be seen in FIG. 3 that the cutting blade 20 of the topping saw 17 has cut the tops of the trees 18 at such a height that the distance from the trees 18 to the electricity wire 12 continuously remains equal. In this way the power line 10 can be cleared in the most advantageous way. None of the trees have been cut too low, as the cutting edge 26 continuously follows the direction of the power line's electricity wire 12, which sags. In FIG. 3 this distance is marked with the letter (b).

Figure 4:
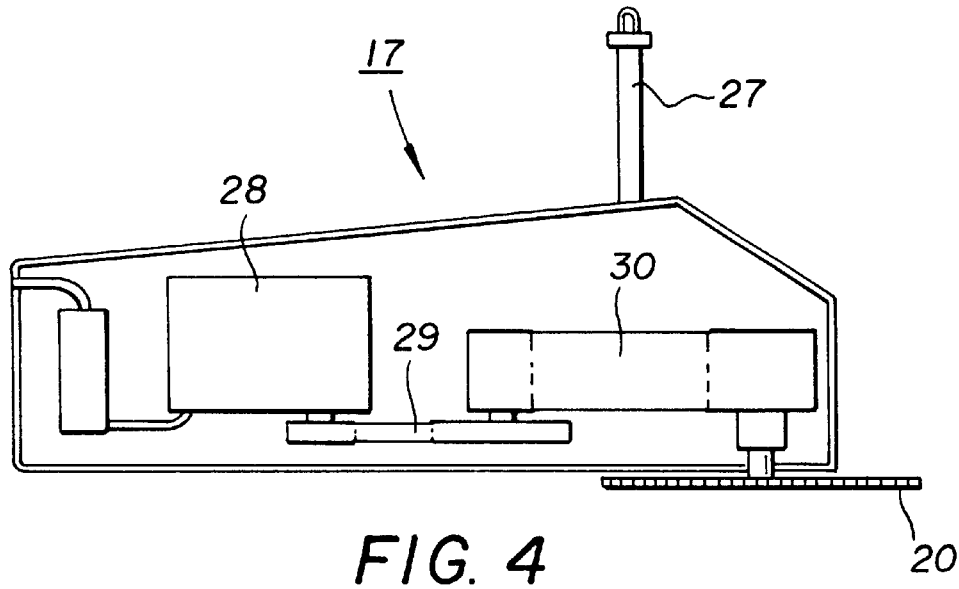
FIG. 4 shows a diagrammatic view of the vertical section of the topping saw relating to the invention.

FIG. 4 shows a vertical section of the topping saw 17 that is to be attached to the helicopter. The topping saw 17 has a projecting suspension element 27 attached to it, which suspension element has been placed so that the topping saw 17 is in balance and the cutting blade 20 is horizontal when the topping saw 17 is suspended from the suspension element 27. The topping saw 17 is also most preferably equipped with a combustion motor 28, which rotates the cutting blades 20 by means of transmission belts 29 and 30.

Figure 5:
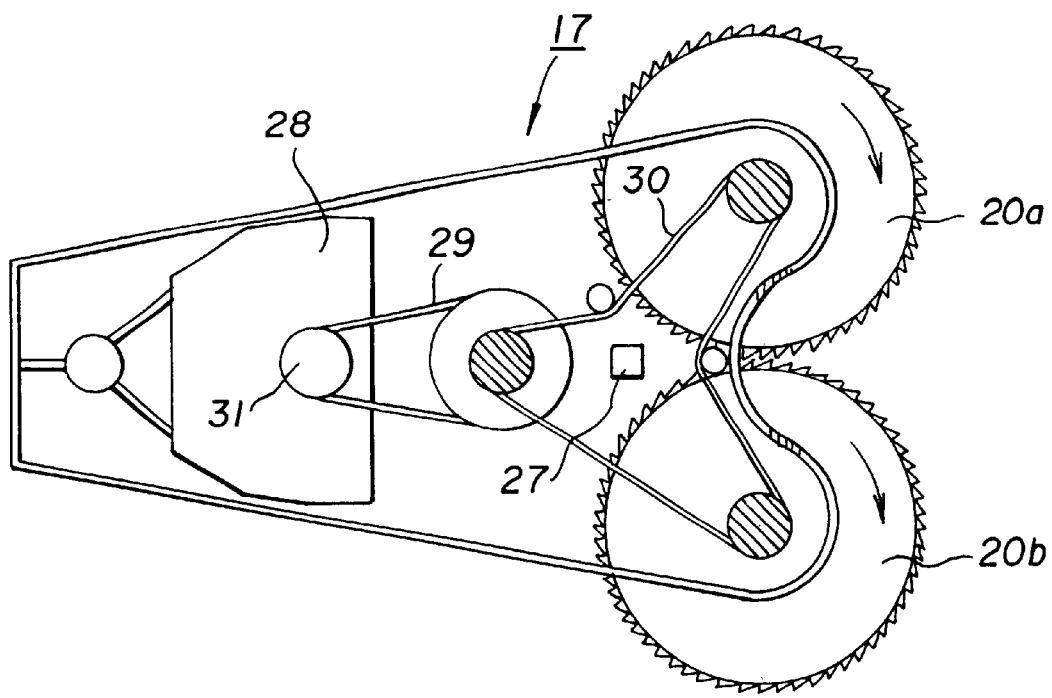
FIG. 5 shows a diagrammatic view of the horizontal section of the topping saw in FIG. 4.

The horizontal section of the topping saw 17 presented in FIG. 5 shows the symmetrical placing of the blades 20a and 20b in relation to the projecting suspension element 27. Correspondingly, the combustion motor 28 has been placed so that the entire topping saw 17 is in balance. It can be seen from the way in which the transmission belts 29 and 30 are installed that the cutting blades 20a and 20b rotate in the same direction at the same rotating speed, which is, due to the transmission elements, lower than the rotating speed of the axle 31 of the combustion motor 28.

It is obvious to a person skilled in the art that the different embodiments of the invention may vary within the scope of the claims presented below.

What is claimed is:

1. A method for cutting tops of trees in the vicinity of an electrical wire of a power line, comprising:
   a) providing a helicopter having a topping saw suspended from the helicopter by a suspending means, said topping saw comprising at least two cutting blades which are rotatable in a horizontal plane when the topping saw is suspended from the helicopter,
   b) suspending a sighting means from said helicopter, said sighting means being arranged at an angle to the horizontal plane, the angle of the sighting means corresponding to an angle of a desired cutting line of the tree tops in a direction away from the power line,
   c) locating the sighting means a distance from said cutting blades based on a distance from said power line of a tree to be cut and a height of cutting of the tree at that distance, and
   d) cutting the tops of the trees in the vicinity of the electrical wire of the power line by flying the helicopter in a direction parallel to the electrical line while directing the sighting device towards the electrical wire.

2. A method as claimed in claim 1, wherein the sighting means is a video camera and a monitor is placed in connection with a cockpit of the helicopter, and the helicopter is flown with the help of the monitor while directing the video camera towards the electrical wire of the power line.

3. A method as claimed in claim 1, wherein the cutting line is formed at an angle of 45° to the horizontal plane and the video camera is attached to said suspending means and arranged at an angle of 45° to the horizontal plane, and the helicopter is flown with the video camera directed towards the electrical wire of the power line.

4. A method as claimed in claim 1, wherein the cutting line is formed at an angle of 45° to the horizontal plane and the video camera is attached to said suspending means and arranged at an angle of 45° to the horizontal plane, and the helicopter is flown with the video camera directed towards the electrical wire of the power line.

5. An apparatus for cutting the tops of trees which are in the vicinity of a power line, said apparatus comprising a topping saw, a suspension means for suspending the topping saw from a helicopter, said topping saw including a motor and at least two cutting blades rotatable in a horizontal plane, and a sighting device arranged in conjunction with said topping saw to be directed towards an electrical wire of the power line in order to determine a desired sawing line to be used when cutting the trees.

6. An apparatus as claimed in claim 5, wherein said sighting device is a video camera attached to said suspension means for the topping saw and a monitor connected to said video camera is arranged in connection with a cockpit of the helicopter with the help of which monitor the helicopter can be flown in such a way so as to achieve a desired sawing line when the video camera is directed towards the electrical wire of the power line.

7. A device as claimed in claim 5, characterized in that the video camera (21) is attached to the suspension bar (16) for the topping saw (17) most preferably at an angle of 45° so that the upper limit (14) of the area where trees (18) are to be cut also forms an angle of 45° in relation to the horizontal plane, and that the distance (h) of the video camera from the cutting blade (20) of the topping saw can be adjusted in order to set the desired distance (a, b) between the point where trees are to be cut and the electricity wire (12).

8. An apparatus as claimed in claim 6, wherein the video camera is attached to the suspension means for the topping saw at an angle of 45° so that an upper limit of an area where trees are to be cut also forms an angle of 45° in relation to the horizontal plane, and that the distance of the video camera from said at least two cutting blades of the topping saw can be adjusted in order to set a desired distance between a point where trees are to be cut and the electrical wire.

* * * * *